Jan. 2, 1951 S. RUBEN 2,536,698
BATTERY CELL AND UNIT
Filed April 23, 1946
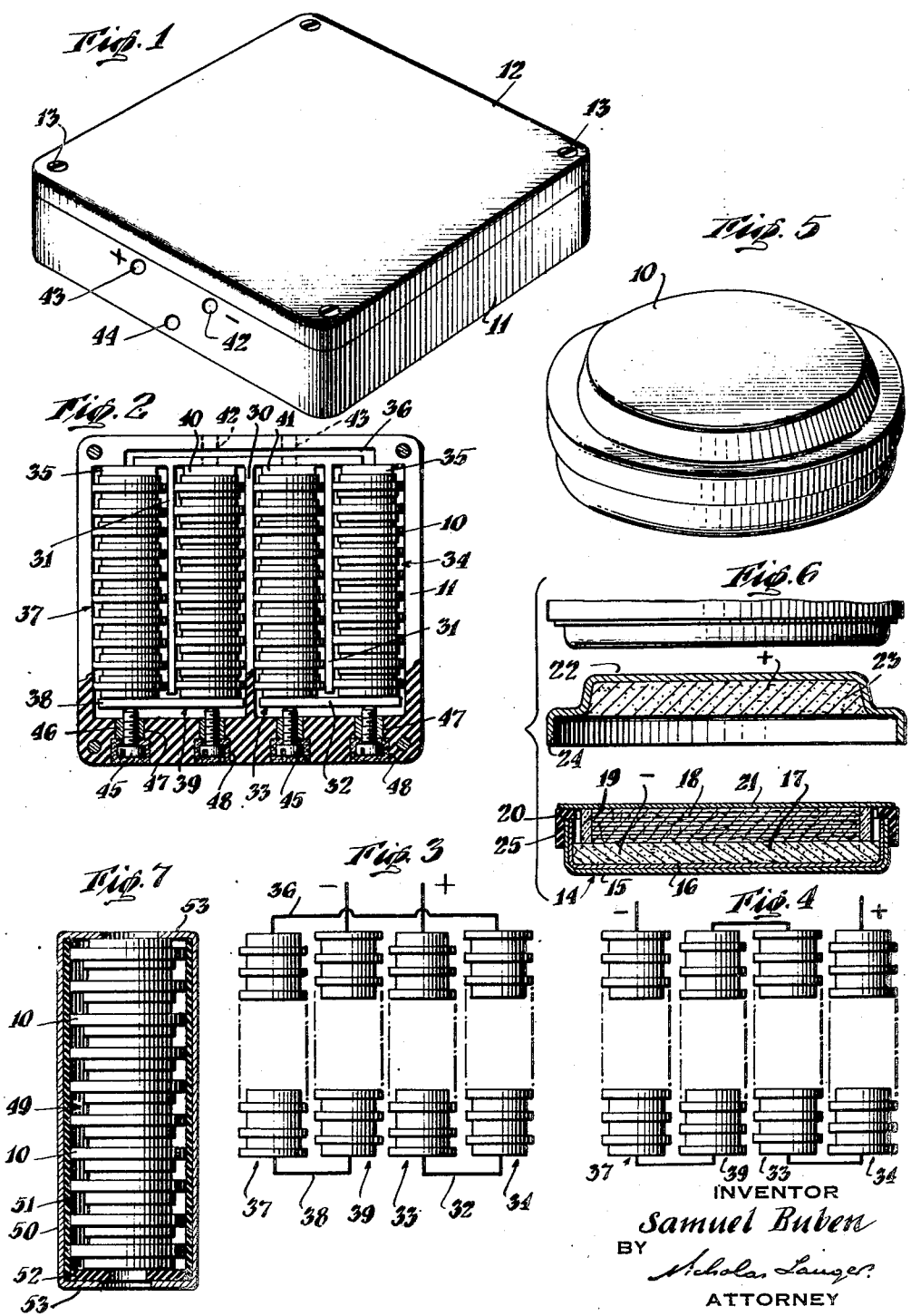
INVENTOR
Samuel Ruben
BY
Nicholas Langer
ATTORNEY Patented Jan. 2, 1951

2,536,698

UNITED STATES PATENT OFFICE 2,536,698

BATTERY CELL AND UNIT

Samuel Ruben, New Rochelle, N. Y.

Application April 23, 1946, Serial No. 664,163

4 Claims. (Cl. 136—111)

1

This invention relates to a battery construction embodying a plurality of cells which is particularly adapted to supply electrical energy for a hearing aid device.

An object of this invention is to provide an improved battery construction and an improved cell arrangement for such battery.

Other objects of the invention will be apparent from the following description and accompanying drawings taken in connection with the appended claims.

The invention accordingly comprises the features of construction, combination of elements, arrangement of parts, and methods of manufacture referred to above or which will be brought out and exemplified in the disclosure hereinafter set forth, including the illustrations in the drawings, the scope of the invention being indicated in the appended claims.

In the drawings:

Figure 1 is a perspective view of a battery casing;

Figure 2 is a plan view, partially in section, of the interior of the battery shown in Figure 1.

Figures 3 and 4 are schematic circuit diagrams showing the connections of the cells in the battery;

Figure 5 is a perspective view of a battery cell;

Figure 6 is a sectional view, partially in elevation, of the cell shown in Figure 5 with the parts in disassembled relation; and Figure 7 is a sectional view, partially in elevation, of a modified battery construction.

According to this invention, a readily portable battery is provided embodying a plurality of cells assembled, in a novel manner, within a battery case. A feature of the invention resides in the assembly of parts to provide a cell having partially sealed interior portions, the arrangement of such cells into stacks and the application of pressure to the stacks after they are positioned within a battery case whereby the parts of each cell are forced into completely sealed assembled relation and a good electrical connection is provided between adjacent cell terminals. Consequently, it is not necessary to assemble and seal each cell individually, as by spinning over the top of the cell, nor to solder or otherwise secure terminal connections to each cell. The cell stacks are connected in circuit by simple and readily adjustable contact members disposed within the battery casing to supply the proper voltage and current to a hearing aid or other electrical device, such connections also being effected without soldering or the use of wire conductors so that the entire battery may be quickly and inexpensively assembled.

While a preferred embodiment of the invention is described herein, it is contemplated that considerable variation may be made in the method of procedure and the construction of parts without departing from the spirit of the invention. In the following description and in the claims, parts will be identified by specific names for convenience, but they are intended to be as generic in their application to similar parts as the art will permit.

Referring now to the drawings in detail, and particularly to Figures 1 and 2, the battery may comprise a plurality of cells 10 mounted and assembled, in the manner hereinafter described, in a case 11 of any convenient size which may be adapted, for example, to fit into the pocket of the user. A cover 12 may be secured to the case as by rivets 13 and such cover together with the case 11 may be formed from molded Bakelite or other suitable insulating material which may have an ornamental outer surface, if desired.

The component parts of each cell, prior to assembly thereof into a stack, may include a bimetal cup 14, Figures 5 and 6, comprising an external steel layer 15 and an inner zinc layer 16. The anode of the cell may be a compressed pellet 17, preferably formed from amalgamated zinc powder containing about 0.05% lead and about 0.002% cadmium, which is mounted in the cup 14 and contacts the inner zinc layer 16. The anode assembly further includes a spacer 18 mounted within a polystyrene ring 19, said spacer 18 consisting of several discs of a porous high purity paper, such as Dexter paper, which may be impregnated, as will be understood by those skilled in the art, with a suitable electrolyte. I prefer to use an electrolyte consisting of 30 to 100 grams of potassium carbonate in 100 milliliters of water to impregnate the spacer 18, it being understood that the excess electrolyte is drained off before the spacer is mounted in the anode assembly.

As an alternative to using the spacer 18 impregnated with a potassium carbonate electrolyte, I may utilize a disc of felted cotton paper which has been treated in the manner now to be described. This disc may be punched from a sheet which has been immersed in an electrolyte consisting of 100 grams of potassium hydroxide (88%), 16 grams of zinc oxide, and 5 grams of sodium carboxymethylcellulose dissolved in 100 milliliters of water. I prefer to vacuum-impregnate the sheet so as to eliminate air pockets and, after impregnation, the sheet is preferably placed in a stainless steel mold and then heated to a temperature of about 117° to 120° C., this being slightly below the boiling point of the electrolyte. It is important that the temperature of the electrolyte does not rise above the boiling point as this would result in an undesirable porous structure. After the heat treatment, the sheet containing the impregnated electrolyte forms a clear transparent gel which is sufficiently tough and flexible to form a desirable barrier layer. The width of the mold in which the heat treatment takes place should be slightly less than the thickness of the impregnated sheet in order that a smooth surface may be produced.

Each cell also comprises a resilient grommet or sealing ring 20, formed, for example, from rubber or neoprene, which is mounted around the edge of the cup 14 so as to engage and seal the sides of the cup. The grommet may be formed from an elastic tube which is stretched to engage the cup in the manner shown or, alternatively, the grommet may be moulded to provide an L-shaped cross-section. A barrier disc 21, preferably of plasticized polyvinyl alcohol or parchment paper, contacts the grommet 20 and spacer 18, said barrier disc being effective to prevent the migration of deleterious particles.

The cathode assembly includes a cap or cover plate 22 within which is disposed a compressed pellet 23 constituting the cathode-depolarizer of the cell. The pellet 23 is preferably composed of 90% red mercuric oxide and 10% micronized graphite. Although the materials used for the anode, cathode, barrier layer, and potassium carbonate are described in more detail by my copending application S. N. 601,626, now Patent 2,458,878, entitled "Primary Cell," the particular materials used form no part of this invention which, accordingly, is not to be limited by the foregoing illustrative description thereof.

The cap 22 has an integral cylindrical flange 24, the interior diameter of which is slightly less than the external diameter of the peripheral grommet portions 25. Accordingly, when the cap is placed in position on the cup 14, the interior of the cell is partially sealed and the cathode pellet 23 contacts the barrier layer 21. It will be appreciated, therefore, that the cells may be very rapidly assembled merely by pushing together the anode assembly and cathode assembly. After assembly, it will be apparent that the cap 22 serves as the positive terminal of the cell while the cup 14 serves as the negative terminal of the cell.

Although the fit between the grommeted cup and the cap serves to partially seal the interior of the cell, additional sealing is ordinarily required to positively prevent the electrolyte from leaking out of the cell and to guarantee a long period of usefulness for the battery. Such additional sealing is secured, in accordance with the invention, by assembling the cells into stacks and applying pressure to the stacks by means of pressure members disposed within the battery casing to force the cap of each cell into engagement with the associated grommet, thus affording additional sealing and insuring good electrical contact between adjacent cells.

In the embodiment of the invention shown in Figures 2 and 3, each stack comprises ten cells connected in series with the bottom of each cup engaging the cap of the adjacent cell. Of course, any suitable number of cells may be used in each stack depending on the voltage desired. It will be apparent, therefore, that the cap 22 and the cup 14 at the respective opposite ends of the stack constitute the positive and negative stack terminals. The stacks are mounted in suitable compartments defined by a central wall 30 and panels 31 which are formed from insulating material and integrally molded with the case 11.

In order to facilitate series connection of the stacks to obtain the desired battery voltage, the stacks are mounted in the compartments so that adjoining stack terminals are of opposite polarities, respectively. The series connection may comprise a contact plate 32 for connecting the negative terminal of stack 33 with the positive terminal of stack 34; contact plates 35 and a conductor rod 36 for connecting the negative terminal of stack 34 with the positive terminal of stack 37; and a contact plate 38 for connecting the negative terminal of stack 37 with the positive terminal of stack 39. Contact plates 40 and 41 are connected, respectively, to the negative terminal of stack 39 and the positive terminal of stack 33, these plates, in turn, being connected to sleeve inserts 42 and 43, respectively, which are mounted in suitable passages in the casing 11. The sleeve inserts 42, 43 together with a guide opening 44, Figure 1, are adapted to receive a three pronged connector plug for making external circuit connections to the battery.

Pressure is applied to each stack of cells through the plates 32 and 38 by pressure screws 45, one of which is in alignment with each stack. The screws 45 may be mounted in sleeve inserts 46 which are disposed in suitable passages 47 formed in the casing 11. Each screw is adjustable to vary the pressure upon the associated stack individually. In this manner, sufficient pressure is applied to the stacks to force the cap of each cell into sealing engagement with the associated cup whereby the electrolyte is positively retained in the cell without danger of leakage or evaporation. The pressure applied by the screws 45 is also effective to insure good electrical contact between adjacent cells of each stack as well as between the stack terminals and the contact plates. The passages 47 may conveniently be countersunk as at 48 so that the head of each adjusting screw may be locked in its final position after the desired stack pressure is obtained. For this purpose, melted pitch or wax may be poured into the countersunk portions 48 and allowed to harden.

The schematic diagram of Figure 4 shows an alternative arrangement of the battery cells 10. This arrangement of cells may be used in the casing 11, Figure 2, by shortening the conductor rod 36 to connect stacks 33 and 39 rather than stacks 34 and 37, and by providing connections from stacks 34 and 37 to the external circuit connectors 42 and 43, respectively. Alternatively, the stacks may be connected in parallel or series-parallel by making obvious changes in the circuit connectors of the battery.

Referring to Figure 7, a battery comprising a single stack is shown which may be used by itself or with other similar units. The cells are assembled in end to end contact in the same general manner and arrangement as has been described herein with respect to the embodiment shown in Figure 2. The stack 49 may be mounted in an elongated container comprising an outer cylindrical steel sleeve 50 having an inner lining 51 of insulating material extending from end to end thereof. A laminated washer 52 is mounted in the base of the sleeve 50, said washer preferably comprising an inner layer of insulating material such as Bakelite which contacts the end of the stack and an outer layer of resilient material such as neoprene. The battery cells 10 are compressed by turned over ends 53 of the sleeve with resultant sealing of the cells and positive contact between adjacent cells. It will be apparent that connection may be made to the negative terminal of the stack through the casing 50 while the positive terminal is accessible through the central aperture in washer 52.

As illustrative of suitable specifications for the battery, each cell may be approximately one-half inch long, one-half inch in diameter, and produce 1.4 volts. Six cells is a suitable number for forming a line or stack although as many cells may be used as desired. The ends of the steel tube 50, Figure 7, may be rolled over one-eighth inch to provide the end portions 53 and the washer 52 may be approximately one-half inch in diameter with a one-quarter inch central opening. Each grommet 20 may be originally 20 mils thick. The entire stack may be compressed in a suitable press and the sleeve 53 may then be turned or spun over to provide and maintain a compressed thickness of 10 mils in each grommet.

While the present invention, as to its objects and advantages, has been described herein as carried out in specific embodiments thereof, it is not desired to be limited thereby but it is intended to cover the invention broadly within the spirit and scope of the appended claims.

What is claimed as new and desired to be secured by Letters Patent is:

1. A battery comprising, in combination, a plurality of cells; each of said cells including a substantially non-compressible metal anode shell and a similar cathode shell respectively containing anode and cathode materials and having outer surfaces constituting terminals for the cell, a grommet of elastic insulative material having a portion extending substantially transversely of the axis of the cell interposed between cooperating portions of said shells and adapted when compressed by the shells in the axial direction to define with said shells a substantially fluid-tight enclosure for the cell, and an electrolyte within said enclosure and in contact with said anode and cathode materials; said cells being arranged in superposed position with the anode terminal of each cell in surface contact with substantially the entire cathode terminal area of the adjoining cell to form a stack; and means for applying pressure upon the stack to cause compression of the transverse portion of said grommets in the axial direction, individual sealing of said cell enclosures, and low resistance electrical connection of said cells in series; the non-compressible character of the said metal shells preventing the possibility of applying destructive pressures upon the individual cells.

2. The battery claimed in claim 1 in which the means applying compression upon the stack of cells are adjustable.

3. The battery claimed in claim 1 in which locking means are provided for securing the compression applying means.

4. A battery comprising, in combination, a plurality of cells; each of said cells including a substantially non-compressible metal cup, a grommet of elastic insulating material secured to the top of said cup having a portion extending inwardly of the rim thereof and having a portion protruding downwardly along the rim thereof, and a substantially non-compressible metal cap fitting over said grommet, said cup and said cap having inner surfaces confining said grommet and having flat outer surfaces constituting terminals of opposite polarity for the cell; said cells being arranged in superposed position with the cup terminal of each cell in surface contact with at least the major portion of the cap terminal area of the adjoining cell to form a stack; and means for applying pressure upon the stack to cause compression of the inwardly extending portions of said grommets in the direction of the axis of the stack, individual fluid-tight sealing of the cell enclosures defined by each cup and cap with their grommet, and low-resistance electrical connection of said cells in series; the non-compressible character of the said metal cups and caps preventing the possibility of applying destructive pressures upon the individual cells.

SAMUEL RUBEN.

REFERENCES CITED

The following references are of record in the file of this patent:

UNITED STATES PATENTS

| Number | Name | Date |
|---|---|---|
| 879,724 | Benjamin | Feb. 18, 1908 |
| 1,425,721 | Taylor | Aug. 15, 1922 |
| 1,568,927 | Stone et al. | Jan. 5, 1926 |
| 1,611,153 | Benner et al. | Dec. 21, 1926 |
| 1,887,811 | Ikin | Nov. 15, 1932 |
| 2,116,091 | Williams | May 3, 1938 |
| 2,307,764 | Deibel | Jan. 12, 1943 |
| 2,307,766 | Deibel | Jan. 12, 1943 |
| 2,424,059 | Scott | July 15, 1947 |

FOREIGN PATENTS

| Number | Country | Date |
|---|---|---|
| 642,763 | France | May 9, 1928 |
| 4,512 | Great Britain | of 1904 |
| 224,484 | Switzerland | Mar. 1, 1943 |